United States Patent [19]
Lackey

[11] Patent Number: 5,975,853
[45] Date of Patent: Nov. 2, 1999

[54] COVER FOR A CEILING APERTURE

[75] Inventor: Robert W. Lackey, Hickory, N.C.

[73] Assignee: R.W.L. Corporation, Hickory, N.C.

[21] Appl. No.: 08/975,643

[22] Filed: Nov. 21, 1997

[51] Int. Cl.⁶ .................................................. B42F 13/00
[52] U.S. Cl. ........................... 416/244 R; 416/5; 248/343
[58] Field of Search ................................... 416/244 R, 5; 248/343

[56] References Cited

U.S. PATENT DOCUMENTS

| D. 256,614 | 8/1980 | Hoyt. | |
| D. 262,570 | 1/1982 | Lock. | |
| D. 263,499 | 3/1982 | Markowitz. | |
| D. 267,195 | 12/1982 | Gomes. | |
| D. 267,196 | 12/1982 | Gomes. | |
| D. 271,330 | 11/1983 | Yung. | |
| 2,119,398 | 5/1938 | Morse. | |
| 3,930,631 | 1/1976 | Laarm | 248/343 |
| 5,349,513 | 9/1994 | Taylor, III | 416/5 |
| 5,613,832 | 3/1997 | Su | 416/5 |

Primary Examiner—Edward K. Look
Assistant Examiner—Richard Woo
Attorney, Agent, or Firm—Hardaway/Mann IP Group Nexsen Pruet Jacobs & Pollard, LLP

[57] ABSTRACT

A cover for an aperture in a ceiling having a shell and a back panel. The shell includes: a wall; an interior portion; and an exterior portion. The interior portion has a tubular hub extending from the wall; fins extending from the wall and from the hub; and blocks extending from the wall. The hub has a central aperture and a distal end with a flange. The exterior portion has a recess cooperating with the hub on the interior portion. The back panel is nestable within the interior portion of the shell. The back panel has an aperture cooperating with the hub on the shell when the back panel nests within the interior portion of the shell. In such an arrangement, the back panel sits on upper surfaces of the fins and blocks. In order to attach to the ceiling, either the recess on the interior portion of the shell or the recess on the exterior portion of the shell is positioned between the mounting plate and the junction box.

9 Claims, 4 Drawing Sheets

COVER FOR A CEILING APERTURE

BACKGROUND OF THE INVENTION

The present invention relates generally to a cover for an aperture in a ceiling. Specifically, the present invention relates to a cover for an aperture associated with a ceiling fan or a light fixture.

Various ceiling fan cover plates currently exist. A sampling of the various cover plates includes U.S. Pat. No. 2,119,398 to Morse and U.S. Design Pat. No. 256,614 to Hoyt; U.S. Pat. No. 262,570 to Lock; U.S. Pat. No. 263,499 to Markowitz; U.S. Pat. Nos. 267,195 and 267,196 to Gomes; and U.S. Pat. No. 271,330 to Yung.

U.S. Pat. No. 2,119,398 to Morse discloses a combined ceiling fan and light fixture. The ceiling fan uses a one-piece cover that slips over an insulating ring to hide the aperture in the ceiling.

U.S. Design Pat. No. 263,499 to Markowitz; U.S. Pat. Nos. 267,195 and 267,196 to Gomes; and U.S. Pat. No. 271,330 to Yung disclose ceiling fan covers of differing ornamentation. U.S. Design Pat. No. 256,614 to Hoyt and U.S. Pat. No. 262,570 to Lock disclose ceiling fan covers and fan blade connectors having differing ornamentation. Despite the unique ornamentation of each individual design disclosed in the design patents, all of the designs have a common feature. All of the designs exhibit visible holes and/or fasteners to an individual beneath the ceiling fan. The holes and/or fasteners are visible since each design uses fasteners to secure the cover to the ceiling fan. The fasteners enter the cover through the exterior surface of the cover. As a result, individuals beneath the ceiling fan can see the fasteners and/or holes.

Clearly, there is room for improvement in the art.

SUMMARY OF THE INVENTION

Therefore, it is an object of the present invention to provide a cover for an aperture in a ceiling.

It is a further object of the present invention to provide a cover for an aperture in a ceiling associated with a ceiling fan or a light fixture.

It is a further object of the present invention to provide a two-piece cover for an aperture in a ceiling.

It is a further object of the present invention to provide a cover that also conceals the installation hardware of a ceiling fan or a light fixture.

It is a further object of the present invention to provide a cover for an aperture in a ceiling on which fasteners are not visible on the exterior surface of the cover.

It is a further object of the present invention to provide a cover for an aperture in a ceiling that is secured to the ceiling without fasteners.

It is a further object of the present invention to provide a cover for an aperture in a ceiling capable of use with electrical junction boxes having different sizes.

These and other objects are achieved in one aspect of the present invention by a cover having a back panel attachable to the ceiling; an exterior wall connected to the back panel; and a hub extending from the exterior wall. The hub has an aperture therethrough to accommodate the installation hardware of the ceiling fan or the light fixture. The hub can be positioned between the mounting plate and the junction box for attachment to the ceiling.

These and other objects are achieved in a second aspect of the present invention by a cover having a shell and a back panel. The shell includes: a wall; an interior portion; and an exterior portion. The interior portion has a tubular hub extending from the wall; fins extending from the wall and from the hub; and blocks extending from the wall. The hub has a central aperture and a distal end with a flange. The exterior portion has a recess cooperating with the hub on the interior portion. The back panel is nestable within the interior portion of the shell. The back panel has an aperture cooperating with the hub on the shell when the back panel nests within the interior portion of the shell. In such an arrangement, the back panel sits on upper surfaces of the fins and blocks. In order to attach to the ceiling, either the recess on the interior portion of the shell or the recess on the exterior portion of the shell is positioned between the mounting plate and the junction box.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION OF THE PREFERRED EMBODIMENTS

Figure 1:
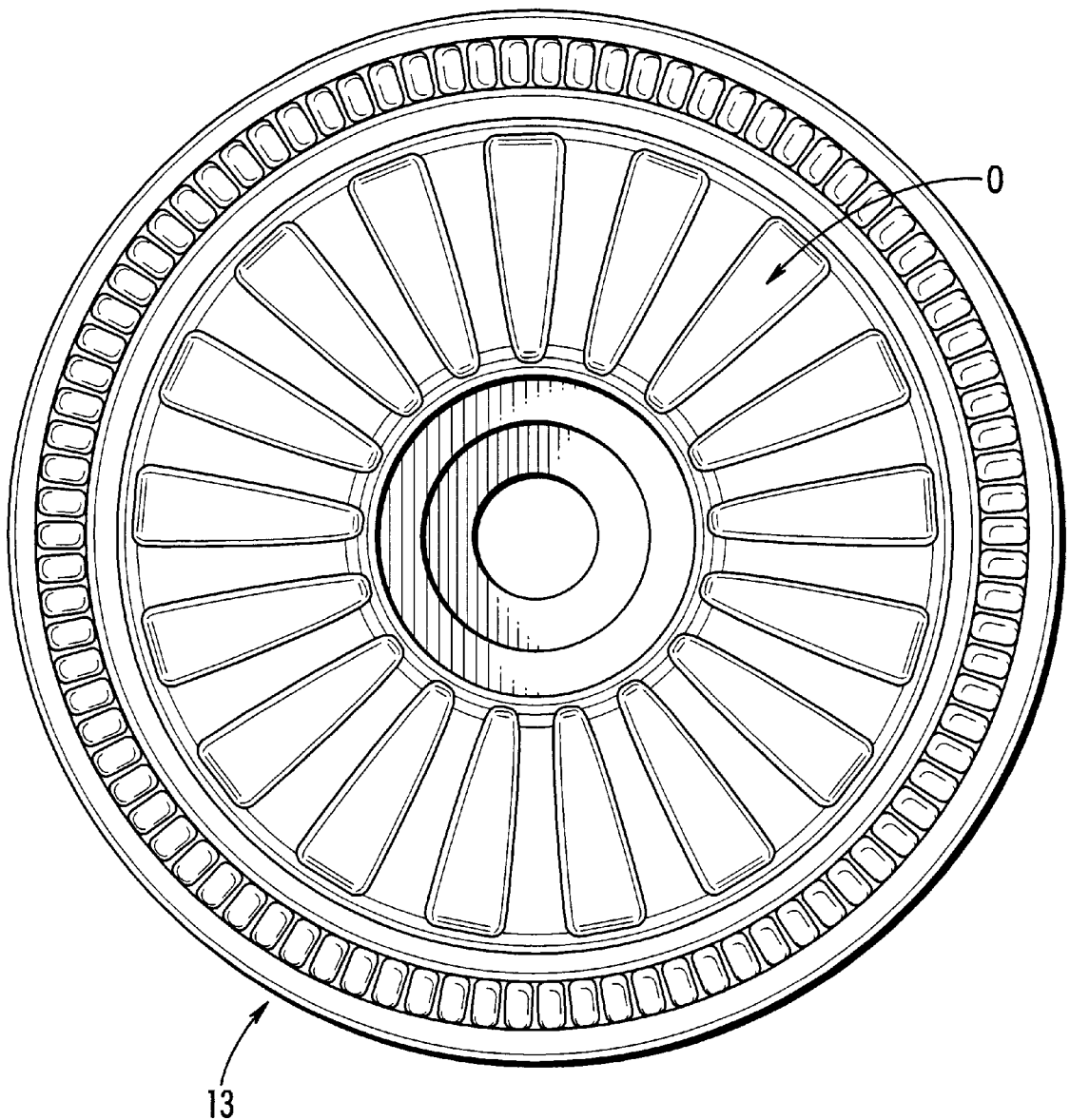
FIG. 1 is a plan view of an exterior portion of the shell portion of the two-piece cover of the present invention.

A ceiling medallion, or cover 10, for concealing an aperture A in a ceiling C will now be described with reference to FIGS. 1–4. Cover 10 can be formed from two individual pieces—a back panel 11 and shell 13. Back panel 11 secures to shell 13 using fasteners (not shown). The fasteners pass through apertures 15 in back panel 11 and secure within posts 17 located in an interior portion 19 of shell 13. Back panel 11 and shell 13 of two-piece cover 10 will now be individually described in greater detail.

Shell 13 can have any desired shape to meet the needs of a particular ceiling aperture or ceiling fixture (such as a ceiling fan or a light fixture). FIGS. 1–4 display shell 13 with a saucer shape. Likewise, shell 13 can be manufactured from any desired material. For instance, shell 13 could be manufactured from impact resistant plastic.

Shell 13 has an exterior portion 21 and interior portion 19. As clearly shown in FIG. 1, an individual views only exterior portion 21 while cover 10 is secured to the ceiling. An individual cannot view interior portion 19 while cover 10 is secured to the ceiling. Accordingly, exterior portion 21 can have any desired shape, contour, texture, etc. to meet the needs of any decor. For example, exterior portion 21 could include ornamentation O as shown in FIG. 1 to portray an antique decor. Exterior portion 21 could also have, for example, a smooth finish. Clearly, shell 13 should be manufactured from a material that allows an individual to paint or stain exterior portion 21 to match the color or finish of the ceiling. Exterior portion 21 of shell 13 should include an annular recess 43. Annular recess 43 provides an additional annular flange, the purpose of which will be discussed in more detail below.

Interior portion 19 is preferably hollow for weight reduction. If desired, insulation (not shown) could fill interior portion 19 for sound dampening or to provide a solid feel to cover 10. The insulation could be, for example, foam. Interior portion 19 includes an annular lip 37 at a radially outermost extent. A central hub 25 extends into interior portion 19 from shell wall 27. Hub 25 is positioned within annular recess 43 of exterior portion 21.

Hub 25 is smaller than a central aperture 35 in an annular shaped back panel 11 in order to allow hub 25 to enter central aperture 35 during assembly. Hub 25 is tubular and includes an annular flange 29 at a distal end, and a central aperture 31. Flange 29 can include several apertures 41 therein. The purpose of flange 29 and/or apertures 41 will be described in more detail below. Central aperture 31 allows the installation hardware, such as electrical wiring (not shown) and supports (not shown), to extend therethrough. The wiring and supports are used to operate and mount a ceiling fan (not shown) or a light fixture (not shown).

Several fins 33 extend radially from hub 25. Fins 33 are attached to hub 25 and shell wall 27. Fins 33 can provide an increased rigidity to shell 13. Most importantly, however, fins 33 allow back panel 11 to rest on their upper surface.

Several posts 17 and blocks 23 also extend into interior portion 19 from shell wall 27. Posts 17 and blocks 23 are preferably circumferentially arranged and positioned near lip 37. Both posts 17 and blocks 23 allow back panel 11 to rest on an upper surface. Therefore, when back panel 11 is seated within interior portion 19 of shell 13, back panel 11 rests on posts 17, blocks 23 and fins 33.

Fasteners can secure back panel 11 to shell 13. Posts 17 have a hollow interior and allow a fastener to secure therein. For example, if the fastener is a screw (not shown), post 17 could have a conventional threaded interior to secure the screw therein.

Figure 2:
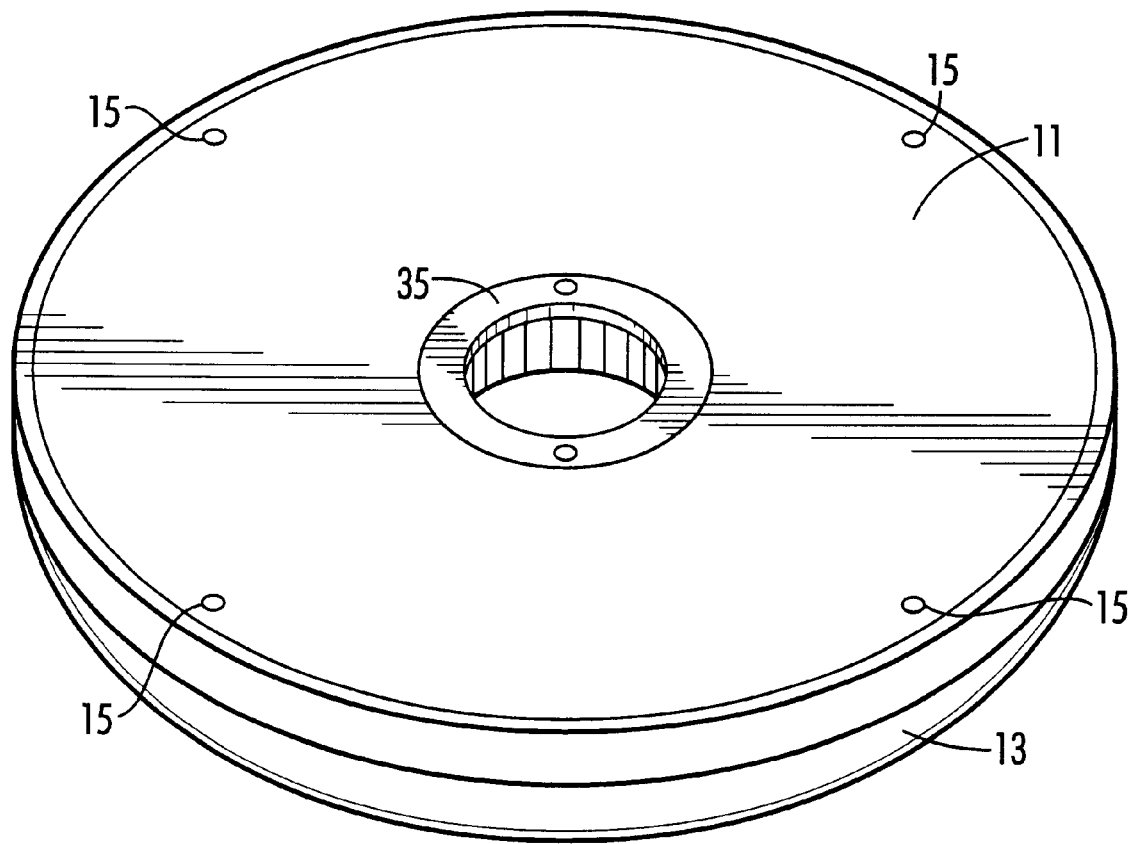
FIG. 2 is a perspective view of the two piece cover of the present invention.
Figure 3:
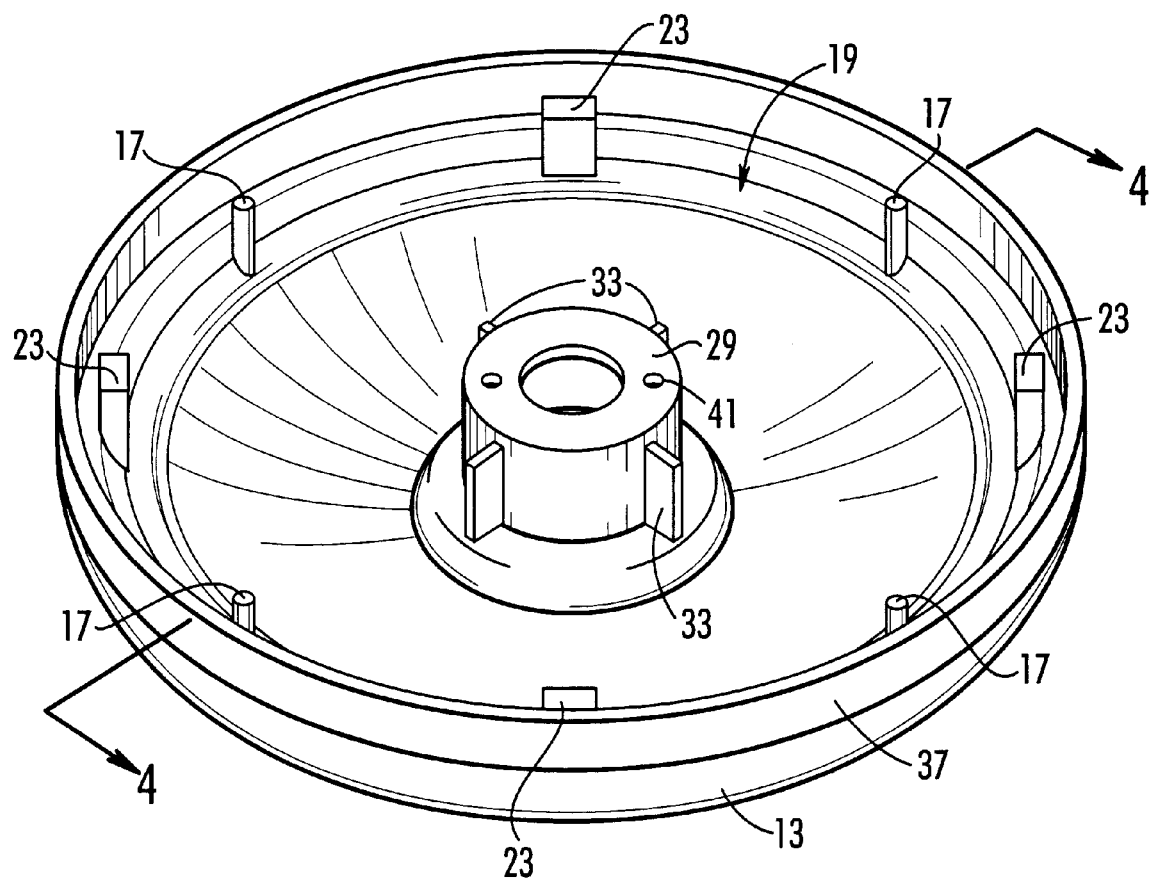
FIG. 3 is a perspective view of the interior portion of the shell portion of the two-piece cover of the present invention.
Figure 4:
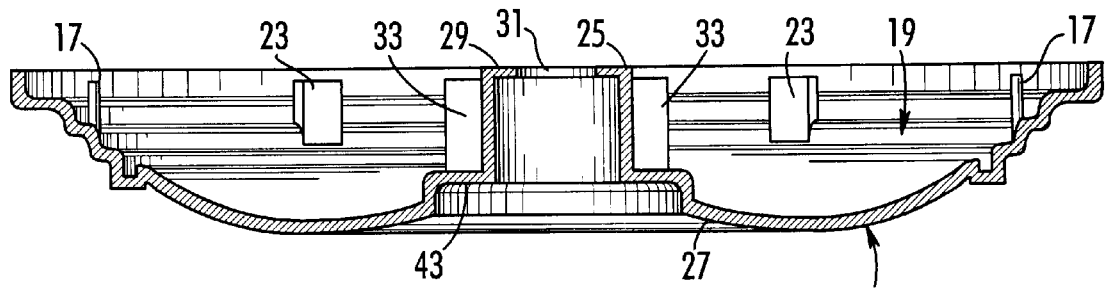
FIG. 4 is a cross-sectional view of the shell portion of the two-piece cover of the present invention taken along line 4—4 in FIG. 3.

Back panel 11 will now be described with reference to FIG. 2. Back panel 11 can have any desired shape to meet the needs of a particular ceiling aperture or ceiling fixture (such as a ceiling fan or a light fixture). FIG. 2 displays back panel 11 as an annular disc to cooperate with saucer-shaped shell 13. Back panel 11 can also be manufactured from any desired material. For instance, back panel 11 could be manufactured from masonite.

The annular-shaped back panel 11 in FIG. 2 includes central aperture 35 and several apertures 15 located near a radial outer extent. When annular back panel 11 seats within interior portion 19 of shell 13, annular back panel 11 rests on the upper surfaces of posts 17, blocks 23 and fins 33. In addition, central aperture 35 accommodates hub 25 of shell 13. Finally, apertures 15 are aligned with posts 17 on shell 13. This allows the fasteners to secure annular back panel 11 to shell 13. As seen in FIG. 2, when correctly seated within shell 13, annular back panel 11 is preferably flush with lip 37 of shell 13.

The installation of cover 10 will now be described with reference to FIGS. 5 and 6. Back panel 11 is seated within interior portion 19 of shell 13 by resting on posts 17, blocks 23 and fins 33. Apertures 15 of back panel 11 are aligned with posts 17 of shell 13 to allow the fasteners to secure back panel 11 to shell 13.

Cover 10 is secured to the ceiling differently depending on the size of an electrical junction box J embedded within the ceiling. Junction box J includes a mounting plates P that extends downwardly from the ceiling. Mounting plate P attaches to junction box J using, for example, screws S. Screws S adjust the position of the mounting plate relative to the junction box.

Figure 5:
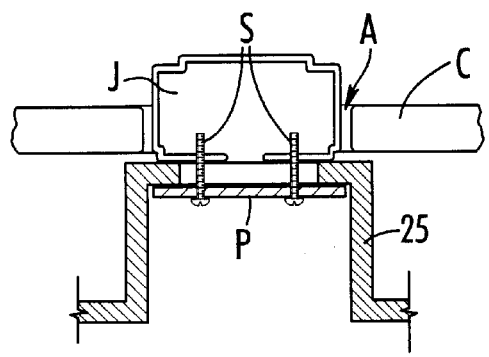
FIG. 5 is a cross sectional view of the hub of the shell portion during installation onto a ceiling having a junction box and mounting plate.

With a smaller junction box as seen in FIG. 5, the mounting plate can fit within hub 25. With such an arrangement, annular flange 29 can be maneuvered to a position between junction box J and mounting plate P. Mounting plate screws S are then tightened, moving mounting plate P towards junction box J. Tightening screws S wedges annular flange 29 between junction box J and mounting plate P.

Figure 6:
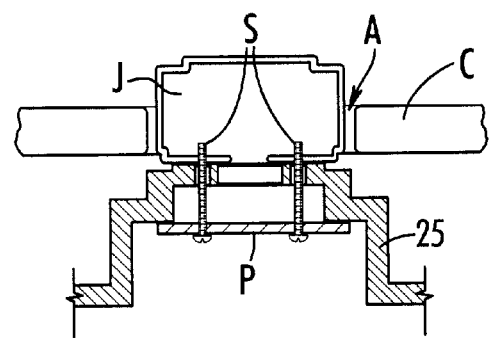
FIG. 6 is a cross-sectional view of the hub of the shell portion during installation onto a ceiling having a different sized junction box and mounting plate.

With a larger junction box as seen in FIG. 6, mounting plate P is too large to fit within hub 25. Mounting plate screws S should be retrofitted with longer screws. With the longer screws, annular recess 43 can be positioned between mounting plate P and junction box J. As the longer mounting plate screws are tightened, mounting plate P moves towards junction box J to wedge annular recess 43 between junction box J and mounting plate P. Depending on the particular arrangement of mounting plate screws S in larger junction box J, mounting plate screws S may need to pass through apertures 41 in annular flange 29 rather than simply passing through central aperture 31.

For additional security of cover 10 on the ceiling, an adhesive (not shown) could be applied to the surface of back panel 11 that contacts the ceiling.

Once cover 10 is wedged between mounting plate P and junction box J (i.e. connected to the ceiling), the light fixture or the ceiling fan can then be attached to the ceiling. The light fixture or the ceiling fan are attached to the ceiling using the mounting plate. The ceiling fan or light fixture attaches to the mounting plate using known techniques.

When assembled, exterior portion 21 of shell 13 is visible to an individual. As seen in FIG. 1, exterior portion 21 of shell 13 does not have any apertures that accommodate fasteners used to secure cover 10 to the ceiling. As a result, the present invention does not have the drawbacks of the prior art. Cover 10 does include central aperture 31. However, central aperture 31 is covered by a canopy (not shown) of the light fixture or the ceiling fan and is not visible.

Applicant recognizes that cover 10 could also be formed unitarily rather than being two piece. Applicant also understands that many other variations are apparent to one of ordinary skill in the art from a reading of the above specification. Such variations are within the spirit and scope of the instant invention as defined by the following appended claims.

I claim:

1. A cover for an aperture in a ceiling, said aperture having a junction box and a mounting plate associated therewith, said cover comprising:
   a back panel attachable to the ceiling;
   an exterior wall connected to said back panel; and
   a hub extending from said exterior wall, said hub having an aperture therethrough;
   wherein said hub is adapted to be positioned between the mounting plate and the junction box for attachment to the ceiling, and said back panel and said exterior wall are separable.

2. The cover for an aperture in a ceiling as recited in claim 1, wherein said hub includes a flange positionable between the mounting plate and the junction box for attachment to the ceiling.

3. The cover for an aperture in a ceiling as recited in claim 1, wherein said exterior wall includes a recess positioned adjacent said hub, said recess positionable between the mounting plate and the junction box for attachment to the ceiling.

4. The cover for an aperture in a ceiling as recited in claim 1, wherein said exterior wall has ornamental features.

5. The cover for an aperture in a ceiling as recited in claim 1, wherein said exterior wall is saucer-shaped.

6. A cover for an aperture in a ceiling, said aperture having a junction box and a mounting plate associated therewith, said cover comprising:

a shell having:
      a wall;
      an interior portion having:
         a tubular hub extending from said wall and located within said interior portion, said hub having a central aperture and a distal end with a flange;
         a plurality of fins extending from said wall and from said hub, said fins having an upper surface; and
         a plurality of blocks extending from said wall and located within said interior portion, said blocks having an upper surface; and
      an exterior portion having a recess cooperating with said hub on said interior portion; and
   a back panel nestable within said interior portion of said shell, said back panel having an aperture cooperating with said hub of said shell when said back panel nests in said interior portion of said shell, said back panel seated on said upper surfaces of said fins and said blocks when said back panel nests in said interior portion of said shell;

wherein one of said recess on said interior portion of said shell and said recess on said exterior portion of said shell is adapted to be positioned between the mounting plate and the junction box for attachment to the ceiling.

7. The cover for an aperture in a ceiling as recited in claim 6, wherein said shell further comprises a plurality of posts extending from said wall and located within said interior portion, said posts having an upper surface;

wherein when said back panel nests in said interior portion of said shell, said back panel seated on said upper surfaces of said fins, said blocks and said posts when said back panel nests in said interior portion of said shell.

8. The cover for an aperture in a ceiling as recited in claim 6, wherein said exterior portion of said shell has ornamental features.

9. The cover for an aperture in a ceiling as recited in claim 6, wherein said shell is saucer-shaped and said back panel is annular.

* * * * *